United States Patent [19]

Stephenson et al.

[11] Patent Number: 5,100,531
[45] Date of Patent: * Mar. 31, 1992

[54] REFINERY ANTI-FOULANT - ASPHALTENE DISPERSANT

[75] Inventors: William K. Stephenson, Sugarland; Bradley D. Mercer, Houston; David G. Comer, Sugarland, all of Tex.

[73] Assignee: Nalco Chemical Company, Naperville, Ill.

[*] Notice: The portion of the term of this patent subsequent to Dec. 17, 2008 has been disclaimed.

[21] Appl. No.: 687,160

[22] Filed: Apr. 18, 1991

Related U.S. Application Data

[60] Continuation-in-part of Ser. No. 655,478, Feb. 14, 1991, which is a division of Ser. No. 433,885, Nov. 8, 1989.

[51] Int. Cl.$^5$ ............................................... C10C 3/00
[52] U.S. Cl. ...................................... 208/22; 524/484; 525/134; 525/142; 525/143
[58] Field of Search ................. 524/484; 525/134, 142, 525/143; 208/22

[56] References Cited

U.S. PATENT DOCUMENTS 2,819,237  1/1958  Daniel ................................. 260/29.4

*Primary Examiner*—Aaron Weisstuch
*Assistant Examiner*—Mary C. DiNunzio
*Attorney, Agent, or Firm*—Robert A. Miller; Donald G. Epple; Joseph B. Barrett

[57] ABSTRACT

An asphalt or asphaltene refinery anti-foulant technique comprising the use in crude oil, or crude oil fraction, streams of alkyl-substituted phenol formaldehyde liquid resins in combination with hydrophilic-lipophilic vinylic polymers. The polymeric anti-foulant is added to asphalt or asphaltene containing crude oil streams to prevent fouling of metallic, or other, i.e. ceramic, surfaces, especially heat transfer surfaces.

6 Claims, No Drawings

REFINERY ANTI-FOULANT - ASPHALTENE DISPERSANT

INTRODUCTION

This is a continuation-in-part of patent application, Ser. No. 655,478, filed Feb. 14, 1991, which is a divisional application of U.S. Ser. No. 433,885, filed Nov. 8, 1989.

Asphalts and asphaltenes are normally occurring constituents in crude oils. These materials have been defined as dark brown to black cementitious materials in which the predominating constituents are bitumens that occur in nature or which are obtained in the processing of petroleum and crude oils. These materials characteristically contain very high molecular weight hydrocarbons sometimes referred to as asphaltenes, and are essentially soluble in carbon disulfide, are primarily aromatic in nature, but may also be identified as containing varying amounts of sulfur, oxygen, and nitrogen.

These asphalt and asphaltene components cause varying degrees of difficulties in various processes which are aimed at recovering crude petroleum oils and preparing them for either transportation through pipelines, or in the refining, separation, or other processes required to recover valuable products from crude petroleum oil. In fact, these asphalt and asphaltene components often cause difficulty by precipitating or fouling pumps installed underground for the purpose of recovering these crude oils. These asphaltenes are also known to foul metallic heat transfer surfaces, such fouling decreasing heat transfer efficiency and clogging and plugging flow channels around or through the heat transfer equipment, heaters, and the like.

The presence of asphalts and asphaltenes in crude oil and in other fractions of petroleum cause difficulties in the recovery, transportation, and treatment and refining of these crude oils and the various fractions of crude oils in which these asphalts and asphaltenes are contained. As a result, it would be an advance in the art if an asphalt/asphaltene dispersant could be used initially in the recovery of crude oil, and/or then later in the transportation and refining or treatment of crude oil or crude oil fractions which contain these asphalts and/or asphaltenes. Such asphaltene dispersants are known, but are based on chemically modified alkyl succinates or on chemically modified cresylic acids, and formulations containing these materials.

OBJECTS

It is therefore an object of this invention to describe a method of dispersing and maintaining in dispersion certain asphalts and/or asphaltenes in crude oil or crude oil fractions in a way to inhibit or prohibit the precipitation and formation of deposits due to the presence of these asphalts and/or asphaltene components.

It is a further object of this invention to identify a series of polymers which act as asphalt and asphaltene dispersants in crude oil and other hydrocarbon fractions of crude oil. The polymers also act as anti-foulant treatments for the refining of crude oil or crude-oil fractions containing these asphaltenes.

It is also an object of this invention to identify compositions of certain alkyl substituted phenol-formaldehyde sins which can act as dispersants for asphalts and asphaltenes in crude oil and crude oil fractions containing these asphalts and asphaltenes.

It is also an object of this invention to identify certain hydrophilic-lipophilic vinylic polymers which also act as asphalt and asphaltene dispersants in crude oil and crude oil fractions.

Finally, it is an object of this invention to teach a combination of polymeric products, which combination include alkyl-substituted phenol-formaldehyde resins and hydrophilic-lipophilic vinylic polymers for use as asphalt/asphaltene dispersants and anti-foulants when added in effective amounts to crude oil, petroleum oil, or fractions thereof, in the recovery, transportation, or treatment and refining of these crude petroleum oils and petroleum fractions. These products are particularly useful when added to crude oil or crude oil fractions containing asphalts and asphaltenes to prevent fouling of heating surfaces in refining operations.

It is an object of this invention to also disclose and teach the combination of polymeric products, which combination include alkyl-substituted phenol-formaldehyde resins and hydrophiliclipophilic vinylic polymers for use as asphalt/asphaltene dispersants and anti-foulants, particularly anti-foulants for heat transfer surfaces, when added in effective amounts to crude oil processing and refinery streams. The addition of these combination of products to refinery streams within refinery crude pre-heat units and pipelines and pipes containing crude oils as anti-foulants and asphalt/asphaltene dispersants is particularly beneficial.

THE INVENTION

We have discovered a method of dispersing and maintaining fluidity of asphalt/asphaltenes fractions in hydrocarbons chosen from the group consisting of petroleum oils, crude oils, and hydrocarbon fractions thereof; which hydrocarbons contain these asphalt and asphaltenes, which method comprises treating the asphalt/asphaltene containing hydrocarbons with an effective asphalt/asphaltene dispersing amount of a liquid polymer chosen from the group consisting of alkyl phenol-formaldehyde resins having a weight-average molecular weight ranging between about 1,000–20,000. Our method may also prevent fouling of heat transfer surfaces in an oil refinery, which surfaces are in contact with crude oil, or crude oil fractions, containing asphalts/asphaltenes.

To prevent fouling of these heat transfer surfaces, an effective anti-fouling amount of a single polymer, but preferably a combination of polymers is added to a refinery stream containing asphalts/asphaltenes and effectively prevents fouling, or if fouling is present due to asphalt or asphaltene deposits, effectively eliminates this fouling.

The liquid alkyl phenol-formaldehyde resins are primarily those resins which contain alkyl substituted phenols where the alkyl substituent can range from $C_4$–$C_{16}$ and is chosen from linear and branched alkyl groups.

Preferably, the substituted phenol-formaldehyde resins are those resins which are derived from $C_6$–$C_{12}$ alkyl substituents, which substituents may be linear or branched alkyl substituents and which are attached to a phenol-formaldehyde resin at either the para or ortho positions (or both) of the phenolic ring making up the phenol portion of said resin. Preferably, the weight average molecular weight of these liquid resins ranges between about 2,000 to about 15,000 and most preferably the molecular weight ranges between about 2,500 to about 12,000. These resins may be linear, branched, or even cross-linked, but when branched or cross-linked, the resins must have only sufficient branching or crosslinking so as to remain liquid at temperatures from 0° C.–500° C., or at least able to be suspended stably in inert hydrocarbon solvents.

The most preferred alkyl substituted phenol-formaldehyde resin is a liquid resin derived from an acid catalyzed or base catalyzed reaction of from 1:15 to 1.5:1 mole ratio of nonyl phenol and formaldehyde, which liquid resin has a weight average molecular weight ranging between about 2,000 to about 8,000.

The treatment of crude oil or crude petroleum oil, or any hydrocarbon fraction thereof, either during the recovery, transportation, or processing and refining of same, with an effective amount of the above identified alkyl substituted phenolformaldehyde resins, is to maintain in dispersion in the treated oil phases these asphalt and asphaltenes and prohibit and/or inhibit fouling, precipitation, or the build-up of asphaltic deposits in equipment that is designed for storing, handling, pumping, transporting, or refining these crude oils, petroleum oils, or fractions thereof. This treatment may be achieved at temperatures as low as $-10°$ C. up to temperatures exceeding 500° C., but the usual temperature of treatment is from about 1° C. to 400° C.

As stated earlier, the effective dispersing amounts of these liquid alkyl phenol-formaldehyde resins are those amounts that range between about 1 to about 10,000 ppm of the liquid resin relative to the crude oil, petroleum, or crude oil fraction that is being treated therewith. The preferred range ranges between about 2.5 to about 1,000 ppm, and the most preferred concentrations range between about 5 ppm to about 500 ppm again based on the resin treating the crude oil, petroleum, or petroleum fraction containing the asphalts and/or asphaltenes.

The alkyl phenol is most preferably a $C_8$-$C_{12}$ alkyl phenol where the alkyl substituent on the phenol ring may be linear or branched, and is most preferably nonyl phenol which is condensed with formaldehyde at approximately a 1:1 mole ratio using either acid or base catalysis, so as to achieve a condensed nonyl phenol-formaldehyde resin which is liquid and has a molecular weight ranging between about 1,000 to about 20,000, preferably between about 2,000 to about 12,000, and most preferably having a molecular weight of about 2,000–5,000.

However, we have also discussed other polymers which may be used to successfully disperse asphalts and asphaltenes in hydrocarbon liquid media, as above, and maintain fluidity of these asphalts and asphaltenes in the hydrocarbons which contain the same. These other polymers are polymers which can be described as hydrophilic-lipophilic vinyl polymers (henceforth H-L V Ps). These H-L V Ps have a weight average molecular weight ranging between about 5,000 to about 250,000, and contain mer units which are repeating and randomly distributed on the polymer backbone, which mer units are derived from the hydrophilic monomers and lipophilic monomers described below.

The lipophilic monomers are primarily those monomers chosen from the group consisting of acrylate or methacrylate fatty esters, i.e. where acrylic or methacrylic acid has been esterified using a fatty alcohol chosen from an alcohol containing from $C_4$-$C_{24}$ carbon groups, thereby leading to an acrylate or methacrylate ester where the ester functionality contains hydrocarbonaceous substituents including linear and branched alkyl substituents, aromatic, cyclic, alkaryl, aralkyl substituents or mixtures thereof; and where the hydrocarbonaceous groups contain from 4-24 carbon atoms.

Preferably these fatty ester acrylates or methacrylates are those esters which are derived from alcohols containing from 8-16 carbon atoms, and preferably are those alcohols, such as lauryl alcohol and the like. The most preferred lipophilic monomer used to form the hydrophilic-lipophilic vinyl polymers is lauryl acrylate.

These lipophilic monomers are polymerized with a vinylic hydrophilic monomer, which hydrophilic monomer is chosen from acrylic acid or methacrylic acid, and their organic or organic salts, and the non-fatty acrylate or methacrylate esters, where the ester functionality contains a polar unit, such as an alcohol, amine, carboxylic acid, amide, quaternary nitrogen salt, and the like. These hydrophilic vinylic monomers are primarily those monomers chosen from acrylic acid, methacrylic acid, acrylamide, methacrylamide, hydroxyethylacrylate, hydroxymethylacrylate, hydroxypropylacrylate, and the like. The most preferred hydrophilic monomer is hydroxyethylmethacrylate.

This hydrophilic-lipophilic vinyl polymer contains from about 90 weight percent to about 10 weight percent of the lipophilic monomer and about 90 weight percent to about 10 weight percent of the hydrophilic monomer. Preferably, these H-L V Ps contain about 70 weight percent of the lipophilic monomer and 30 weight percent of the hydrophilic monomer. However, these polymers may also contain any ratio of lipophilic monomer to hydrophilic monomer which ranges between about 10:1 to about 1:10.

These H-L V Ps are copolymers which can contain at least one or more of both of the above described hydrophilic and lipophilic monomer units, and are those polymers which can have molecular weights ranging from about 5,000 up to about 250,000, preferably between about 10,000 up to about 150,000, and most preferably are those polymers which have a weight average molecular weight ranging between about 20,000–100,000. The most preferred hydrophiliclipophilic vinylic polymer which may be used by itself, or in combination with the alkyl phenol-formaldehyde resins described above, are H-L V Ps derived from lauryl acrylate and hydroxyethylmethacrylate, which polymers contain from about 80 to about 30 weight percent lauryl acrylate and from about 20 to about 70 weight percent hydroxyethylmethacrylate. These lauryl acrylate/hydroxyethylmethacrylate H-L V Ps have a molecular weight normally ranging between about 10,000–150,000, and preferably between about 20,000–100,000, and most preferably between about 40,000–80,000. In all cases, where molecular weight is referred to in this application, it is referred to in terms of weight average molecular weight.

THE POLYMERIC ANTI-FOULANT COMBINATIONS OF POLYMERS

The alkyl phenol-formaldehyde resins and the H-L V Ps described above and later, may be used either alone in treating hydrocarbons which contains asphalts or asphaltenes, or preferably they are used in combination, one with the other. The combination can include from 100 percent alkyl phenol- formaldehyde liquid resin and zero percent hydrophilic-lipophilic vinylic polymer to zero percent alkyl phenol-formaldehyde liquid resin and 100 percent hydrophilic-lipophilic vinylic polymer.

However, it is preferred that the alkyl phenol-formaldehyde liquid resins described above are present between about 5 to about 95 weight percent and the H-L V Ps are present from about 95 to about 5 weight percent in a formulation to be used to treat crude oils, petroleum oils, or hydrocarbon fractions thereof, which contain asphalts and asphaltenes.

It is particularly useful to use as the asphaltene antifoulant and dispersant of this invention, an asphalt/asphaltene dispersant/antifoulant which comprises from 20 to 100 weight percent of an alkyl substituted phenol-formaldehyde liquid resin having about a 1:1 mole ratio of alkyl phenol to formaldehyde and a molecular weight ranging between about 1,000 to about 20,000, and wherein the alkyl substituent is a linear or branched alkyl group containing from five to twelve carbon atoms; and from 80 to 0 weight percent of a hydrophilic-lipophilic vinylic polymer having a molecular weight between 5,000–250,000, and containing from 90 to 10 weight percent of a fatty (meth)acrylate ester and from 10 to 90 weight percent of a hydrophilic monomer chosen from the group consisting of (meth) acrylic acid, (meth) acrylic-acid salts, and (meth) acrylic acid alkoxylate esters.

By the term "fatty (meth)acrylate" we mean either an acrylic acid or a methacrylic acid ester derived from a fatty alcohol containing from four (4) to twenty-four (24) carbon atoms, and preferably from 8–16 carbon atoms and being either linear or branched alkyl alcohols. In general, the term (meth)acrylic(ate) refers to either or both of acrylic acid, or their salts, esters, or the like. (Meth)acrylic acid salts can include alkali metal salts, alkaline earth metal salts, ammonium salts, or salts derived from protonated amines (primary, secondary, or tertiary amines) or from quaternary amines. The ester of (meth)acrylic acid can also include alkoxylate esters such as hydroxyethyl (meth)acrylate. The alkoxylate esters are primarily hydrophilic monomers while the alkyl esters are primarily lipophilic monomers, particularly when the alcohol used to esterify the (meth)acrylic acid has at least four carbon atoms.

Preferably the effective method for treating crude oils, petroleum oils, and petroleum or hydrocarbon fractions which contain asphalts and asphaltenes is a method which permits the treatment of these hydrocarbon materials with from about 1.0 up to about 10,000 ppm, based on the hydrocarbon material treated, of any of the asphaltene dispersant formulations of this invention, but the preferred method uses a dispersant formula which contains from 60–95 weight percent of a nonyl phenol-formaldehyde liquid resin, having a molecular weight between about 1,000 to about 12,000, and which dispersant formulation also contains about 40 to about 5 weight percent of a hydrophilic-lipophilic vinylic polymer, which hydrophilic-lipophilic polymer contains from 80–20 weight percent lauryl acrylate and from about 20–80 weight percent hydroxyethylmethacrylate. As before, the preferred molecular weight of this hydrophilic-lipophilic vinylic polymer ranges between about 20,000–100,000, and most preferred molecular weight ranges between about 40,000–80,000.

Use in Refinery Applications as an Anti-Foulant

To demonstrate the use of our formulations as an anti-foulant and asphalt/asphaltene dispersant, a thermal fouling test, referred to as the Alcor test, was used as follows:

A heater tube made of metal was prepared using standard carbon steels. This heater tube was prepared as follows:

A) The tube was polished using a fine emery paper
B) The tube was immersed in 10% aqueous hydrochloric acid for 30 seconds making sure that the inside of the tube is also clean. To assure cleanliness, the inside of the tube could be reamed out with copper mesh or copper wire.
C) Both the inside and the outside of the tube was rinsed with deionized water followed with 2-propanol and then hexane. The tube was dried.
D) The tube was polished again with fine emery paper followed by a finishing polish with a soft cloth or paper towel.
E) Both the inside and the outside of the tube was again rinsed with hexane and both inside and outside surfaces were dried using compressed air or nitrogen blown over both and all surfaces.

II. The tube was assembled into a test section containing hydrocarbon reservoir and heating and pumping means, attached to heating and cooling busses on the base module, and attached to sample inlet and outlet means. Thermocouples were attached to the tube surfaces and screwed on finger tight.

III. A stirring bar was placed into the hydrocarbon reservoir and 800 ml. of crude oil and the appropriate dosage of anti-foulant added.

IV. A piston was inserted into the reservoir and worked down to the oil surface thereby excluding all air.

V. Covers were attached and protected with gaskets to the reservoir which was connected to the test sections.

VI. An Alcor thermal fouling temperature program was used in all cases as follows:
a) Ramp outlet temperatures ranging from ambient temperatures to 625° F. were programmed over a period of 15 minutes.
(b) The outlet temperature was held constant at 625° F. for 100 minutes.
(c) The outlet temperature was programmed on a ramp basis taking the temperature from 625° F. to ambient temperatures over a period of 20 minutes, providing that the heater tube temperature could be varied to achieve these resulting temperatures.

To begin the test, the temperature program above was initiated. When the outlet temperature reach 625° F., the heater skin temperature was automatically recorded. The amount of fouling was calculated on the basis of the change in temperature of the heater tube after 90 minutes of exposure to 625° F. temperatures. To exemplify the use of our asphalt/asphaltene anti-dispersants, anti-foulants, and/or dispersants, the following examples are presented.

The test procedure for evaluating asphaltene dispersants was developed as follows:
1) 10 ml of hexane is added to a graduated centrifuge tube. To this tube is added the test dispersant. The test dispersant may be added in a diluted form, but is preferably present at dosages (on an active basis) ranging between 1 to about 100 ppm.
2) To the mixture now contained in the centrifuge tube, 100 μl of an asphaltene stock is added. The stock is formed by dissolving 10 percent, by weight, of an asphaltic crude oil (such as an oil obtained from Wyoming) into a heavy aromatic naphtha solvent having a boiling point above 200° C.
3) The centrifuge tubes are then capped and shaken vigorously for about twenty - thirty seconds, or shaken by hand at least fifty times. The centrifuge tubes are set aside and the contents allowed to settle. The volume percent of precipitate is recorded as a function of time, and at a given time, a percent retention value is calculated.

4) When settling of the residue is complete, 1 ml of the top layered supernate is collected, diluted with 3 ml of the same heavy aromatic naphtha used to make up the standard solutions, and the optical density or absorbance of this sample as measured at 475 nanometers by a mini-spec 20 photometer is obtained.

5) Performance is indicated by two parameters: One parameter is the percent retention of asphalt/asphaltenes in the upper phase in a given time, as measured by the volume ratio of asphaltenes to solvent layers; and the other parameter is the percent dispersion as measured by the optical density or absorbance from the upper supernate liquid layer.

6) The percent retention expresses the difference in asphaltene precipitation volume between a sample and the blank, as a percent of the precipitation volume of the blank, i.e., the percent retention equals the precipitate volume of the blank minus the precipitate volume of the treated sample, divided by the precipitate volume of the blank.

7) The percent dispersion value is calculated as the optical density of the sample minus the optical density of the blank divided by the optical density of the reference minus the optical density of the blank, times one hundred.

Using these test procedures and calculations, the data in Tables I, II, III, and IV, were generated. The results were obtained using the alkyl phenol-formaldehyde resins of this invention, and their combination with the preferred H-L V Ps of this invention. These resins are compared to commercial products which are either derived from isobutylene maleic anhydride products, which products are then esterified and formulated as dispersants for asphalts/asphaltenes, or commercial products which are formulated based on cresylic acid modified materials.

TABLE I

Asphaltene Dispersant Test Results[a]

| Sample | % Retention 80 min. | Description | Dosage (ppm) | Volume % Precipitate 5 min. | 10 min. | 80 min. |
|---|---|---|---|---|---|---|
| 1 | 80 | Nonyl phenol-formaldehyde resin | 10 | 0.2 | 0.3 | 0.6 |
| 2 | 81 | Commercial product "A" | 10 | 0.3 | 0.5 | 0.8 |
| 1 | 75 | Nonyl phenol-formaldehyde resin | 50 | 0.2 | 0.4 | 0.8 |
| 2 | 75 | Commercial product "A" | 50 | 0.3 | 0.6 | 1.0 |
| Blank | 69 / 0 | Blank | — | 1.5 | 2.8 | 3.2 |

[a]Asphaltenes from a Northern state refinery

TABLE II

Asphaltene Dispersant Test Results[a]

| Sample | % Retention 210 min. | Description | Dosage (ppm) | Volume % Precipitate 15 min. | 210 min. |
|---|---|---|---|---|---|
| 1 | 210 | Nonyl phenol-formaldehyde resin | 5 | 0.5 | 1.1 |
| 2 | 74 | Commercial product "A" | 5 | 0.8 | 0.9 |
| 1 | 79 | Nonyl phenol-formaldehyde resin | 50 | 0.5 | 0.9 |
| 2 | 79 | Commercial product "A" | 50 | 0.5 | 1.1 |
| 3 | 74 | Aromatic naphtha | 50 | 1.1 | 3.0 |
| Blank | 29 / 0 | Blank | — | 3.0 | 4.2 |

[a]Asphaltenes from a Northern state refinery

TABLE III

Asphaltene Dispersant Test Results[a]

| Sample | % Retention[b] 8 hrs. | % Retention[b] 18 hrs. | Description | Dosage (ppm) | Volume % Precipitate 8 min. | 80 min. | 18 hrs. | 18 |
|---|---|---|---|---|---|---|---|---|
| 1 | | 40 | Nonyl phenol-formaldehyde resin | 5 | 0.2 | 0.5 | 1.5 | 62 |
| 2 | | 38 | Commercial product "A"[d] | 5 | 0.2 | 0.6 | 1.5 | 62 |
| 3 | | 17 | Aromatic naphtha | 5 | 1.8 | 3.0 | 3.0 | 25 |
| 4 | | 24 | Commercial product "B"[e] | 5 | 0.3 | 2.3 | 3.5 | 22 |
| 5 | 0 | 8 | Commercial product "C"[f] | 5 | 1.0 | 4.2 | 4.0 | |
| | 0 | 0 | Blank[g] | — | 3.2 | 4.2 | 4.0 | |
| | | | Reference[h] | — | — | — | — | |

TABLE III-continued

Asphaltene Dispersant Test Results[a]

| Sample % Retention[b] | % Retention[b] | Description | Dosage (ppm) | Volume % Precipitate 8 min. | 80 min. | 18 hrs. | 18 |
|---|---|---|---|---|---|---|---|
| | 100 | | | | | | |

[a]Asphaltenes extracted from Wyoming crude oil
[b]Based on amount of precipitate
[c]Based on optical density of hexane phase
[d]Isobutylene-maleic anhydride/esterified based product
[e]Cresylic acid based product
[f]Cresylic acid based product
[g]Hexane & asphaltene*
[h]Aromatic solvent & asphaltene*
*Hexane addition to petroleum fractions tends to precipitate asphalts/asphaltenes from these fractions, therefore no retention, or very little retention is observed. Normally, aromatic solvents do not have this effect and therefore retention is very high, or complete.

TABLE IV

Asphaltene Dispersant Test Results[a]
Alkyl phenol-Formaldehyde Resin Series

| Sample | Phenol-Alkyl Groups | Resin MW | PPM | % Dispersion |
|---|---|---|---|---|
| 1 | nonyl | 2,300 | 10 | 36 |
| 2 | nonyl | 4,500 | 10 | 51 |
| 3 | t-amyl | 3,300 | 10 | 23 |
| 4 | nonyl/butyl | 1,400 | 10 | 26 |
| 5 | nonyl/dinonyl | 2,000 | 10 | 33 |
| 6 | nonyl/dinonyl | 3,500 | 10 | 40 |
| 1 | nonyl | 2,300 | 40 | 40 |
| 2 | nonyl | 4,500 | 40 | 47 |
| 3 | t-amyl | 3,300 | 40 | 37 |
| 4 | nonyl/butyl | 1,400 | 40 | 29 |
| 5 | nonyl/dinonyl | 2,000 | 40 | 37 |
| 6 | nonyl/dinonyl | 3,500 | 40 | 35 |
| blank | | — | | 0 |

[a]Asphaltenes from a refinery in a northern winter state (U.S.)

Using the anti-foulant test previously described, the percent dispersions and fouling factors were calculated for two materials. One material is an alkyl succinate ester used commercially as anti-foulant for refinery streams containing asphalts and asphaltenes. This is referred to as the alkyl succinate ester in the following data. Also a polyisobutylenethio ester component was tested, this component also being a material of commercial interest.

Lastly, formulation A was tested, which formulation contained 6.36 grams of an acrylate/methacrylate polymer as previously described, 19.09 grams of nonylphenol formaldehyde resin, as previously described, all dissolved in 74.55 grams of an aromatic solvent.

Using this test the following results were obtained:

| 1) Flashed Crude | Treatment ppm | % Disp. |
|---|---|---|
| | 0 | 0 |
| Alkylsuccinate Ester | 50 | <99 |
| Formula A | 50 | 81 |

| 2) Asphaltene stock solution (10% [w/w] in toluene) | Treatment ppm | % Disp. |
|---|---|---|
| | 0 | 0 |
| Alkyl Succinate Ester | 50 | 72 |
| Formula A | 50 | 90 |

3) Asphaltene stock solution

| Dosage: (ppm) Product: | 10 | 25 | 50 | 100 | 250 |
|---|---|---|---|---|---|
| | | | % Dispersed | | |
| A) Alkyl Succinate Ester | 77 | 82 | 85 | 78 | 78 |
| B) Formula A | 83 | 83 | 83 | 82 | 79 |
| C) Polyisobutylenethio Ester | 68 | 75 | 77 | 79 | 77 |

With this information in mind, we also have developed a process and a method of treating refinery streams, particularly crude oil feed streams, flashed crude streams, and in general hydrocarbon refinery streams exposed to thermal distillation, thermal treatment, thermal cracking, and the like. We treat these crude oil streams with the polymers and the combination of polymers described above for the purpose of reducing fouling of heat transfer surfaces, or pipeline surfaces exposed to these hydrocarbon streams. The surfaces exposed to these hydrocarbon streams, which surfaces may themselves be exposed to heat transfer phenomenon can include pipelines, furnace surfaces, heater surfaces, heat exchange surfaces, and the like.

A method of decreasing fouling of heat transfer surfaces in contact with hydrocarbon streams containing asphalts and asphaltenes has then been developed. This decreased fouling is demonstrated by the Alcor thermal fouling test, which provides for use of flash crude in the test procedure. Untreated crude, in this test, gave an average surface temperature increase equal to 74° F. When treated with 500 parts per millions of our formulation A as described above, an average surface temperature increase of 58° F. was obtained, demonstrating the efficacy of our combinations in reducing fouling of a furnace surface in contact with asphaltene and/or asphalt contaminated hydrocarbons. Importantly, this information also demonstrates that our formulations do not cause fouling, as is observed with many high molecular weight polymers sometimes used to treat these contaminated hydrocarbons. The test was achieved with 800 ml. of hydrocarbon treated with 500 parts per million of our formulation A. This material was poured into the feed reservoir, pressured to 500 pounds per square inch and pumped through the Alcor testing device described earlier. The testing device was set such that the fluid outlet temperature was 625° C., the flow rate was 3 ml. per minute, the pressure was 500 pounds per square inch, ramp time was 15 minutes, run time was 90 minutes and cool off time was 20 minutes.

In addition to the data previously presented, five formulations were created, which formulations are given below.

| Formulation | Wt. Ratio of H-L V P: | Nonyl Phenol/Formaldehyde |
|---|---|---|
| A | 25/75 | |
| B | 0/100 | *All formulations |
| C | 100/0 | contained in solvent at |
| D | 50/50 | 25.45 wt. % active |
| E | 75/25 | polymer(s). |

These formulations, A, B, C, D, and E, were then tested in the standard asphaltene dispersion test and gave the results presented in Table VIII.

In Table VIII, the test formulations and dosage are given and the percent dispersion of asphaltenes given.

TABLE VIII

| Additive | ADT Experiments Dosage (ppm) | % Dispersion |
|---|---|---|
| Crude Oil I - "Wyoming-Black!" | | |
| — | — | 0 |
| B | 10 | 69 |
| B | 25 | 74 |
| B | 50 | 76 |
| B | 100 | 81 |
| B | 250 | 88 |
| C | 10 | 56 |
| C | 25 | 68 |
| C | 50 | 86 |
| C | 100 | 94 |
| C | 250 | 81 |
| D | 10 | 63 |
| D | 25 | 94 |
| D | 50 | 94 |
| D | 100 | 97 |
| D | 250 | 97 |
| E | 10 | 71 |
| E | 25 | 98 |
| E | 50 | 98 |
| E | 100 | 99 |
| E | 250 | >99 |
| A | 10 | 87 |
| A | 25 | 89 |
| A | 50 | >99 |
| A | 100 | >99 |
| A | 250 | >99 |
| Crude Oil II - Alaska North Slope! | | |
| — | 0 | 0 |
| B | 10 | 78 |
| B | 25 | 92 |
| B | 50 | >99 |
| B | 100 | >99 |
| B | 250 | >99 |
| C | 10 | 82 |
| C | 25 | 92 |
| C | 50 | >99 |
| C | 100 | >99 |
| C | 250 | >99 |
| D | 10 | 82 |
| D | 25 | 94 |
| D | 50 | >99 |
| D | 100 | >99 |
| D | 250 | >99 |
| E | 10 | 82 |
| E | 25 | 94 |
| E | 50 | >99 |
| E | 100 | >99 |
| E | 250 | >99 |
| A | 10 | 90 |
| A | 25 | 99 |
| A | 50 | >99 |
| A | 100 | >99 |
| A | 250 | >99 |
| Crude Oil III - West Texas Intermediate! | | |
| — | — | 0 |
| B | 10 | 54 |
| B | 25 | 58 |
| B | 50 | 67 |
| B | 100 | 76 |
| B | 250 | 92 |
| C | 10 | 59 |
| C | 25 | 71 |
| C | 50 | 78 |
| C | 100 | 92 |
| C | 250 | 98 |
| D | 10 | 74 |
| D | 25 | 78 |
| D | 50 | 81 |
| D | 100 | 91 |
| D | 250 | >99 |
| E | 10 | 81 |
| E | 25 | 82 |
| E | 50 | 95 |
| E | 100 | >99 |
| E | 250 | >99 |
| A | 10 | 57 |
| A | 25 | 65 |
| A | 50 | 79 |
| A | 100 | 83 |
| A | 250 | 98 |

The formulations were all made up such that the products were evaluated on an equivalent basis. All products tested contained 25.45 weight percent active polymeric ingredients, bu the concentrations given in Table VIII were calculated no a part per million active polymeric ingredient basis, relative to the test hexane volume.

The nonyl phenol-formaldehyde resins used in Tables I and II are those resins having a molecular weight ranging between about 2,000 and about 6,000, and are formed by reacting nonyl phenol and formaldehyde in about a 1:1 mole ratio with an acid catalyst.

The commercial product "A" is a commercial product based upon isobutylene-maleic anhydride adducts which are then esterified with fatty alcohols or ethoxylated.

In all Tables, the asphaltenes are derived from refinery asphaltenes and are used as indicated in the above test procedures. In Table III, commercial product "B" and commercial product "C", are both products derived from cresylic acid modified materials.

In Table IV, various alkyl phenol-formaldehyde resins have been synthesised with various molecular weights and tested as asphalt/asphaltene dispersions. The asphaltenes tested in Table IV come directly from a refinery located in a northern winter state of the United States.

In addition to the tests listed above, a product was formulated which contained 75 weight percent of the preferred nonyl-phenol product and 25 weight percent of the preferred hydrophilic-lipophilic vinylic polymer. In this case, the hydrophilic-lipophilic vinylic polymer contained 75 weight percent lauryl acrylate and 25 weight percent hydroxyethylmethacrylate.

This 75:25 weight ratio of nonyl phenol-formaldehyde resin and H-L V Ps were dissolved in an inert aromatic naphthenic hydrocarbon solvent so that the asphaltic dispersant solution contained 25 weight percent total polymeric solids. This solution was then added to crude oils which had been recovered at a well head and fed into a treater being used to resolve the crude oil emulsions. Not only did the crude oil treater perform in a superior manner in terms of separating water from crude oil phases, but the underground recovery of crude oil performed more efficiently because asphalt and asphaltene deposits were removed from pumps, pipelines, and pumping surfaces, valves and the like, in transport of the crude oil to the heated treater used in resolving water and petroleum oil phases as an initial treating stage prior to transferring the oil phase to a pipeline company for transport to storage and refining plants.

A test of the blend of preferred nonyl phenol-formaldehyde liquid resins and the hydrophilic-lipophilic vinylic polymer described above, which blend was dissolved in the solvents described above at the same concentration (25 percent), was added to separated crude oil phases which were again passed through a heated treater at about 160° F. to resolve and separate the water phase simultaneously collected with the crude oil. After the treater resolved the emulsion, crude oil hydrocarbons were isolated, transferred by pumping through pipelines into a stock tank, automatically sampled, and based on testing, transferred to a pipeline through which they were transported to storage and/or refineries for further processing.

The pipeline company had certain criteria in regards to viscosities, fouling characteristics, solids, and the like, which criteria were met when using the blended asphaltene dispersants of this invention. Likewise, a crude oil obtained at the well head, passed through a "heated treater", for water/oil resolution, and stored in a crude oil stock tank, had, over a period of time, collected precipitated asphalt and asphaltenes in the bottom of a 500 barrel (about 27,500 gallon) tank, so that approximately 8-10 inches of the bottom of the tank contained a hard asphalt/asphaltene deposit which was no longer suspended in the oil fraction The well produced approximately 120 barrels of a 17 gravity oil and 80 barrels of water per day. The treater performance was erratic primarily due to periodic recycling of the stock tank bottoms, later demonstrated to contain high concentrations of asphalts/asphaltenes into the treater. Emulsion-breaking chemicals and other commercial asphaltene dispersants were being added to the annulus of the well head at rates ranging between about 5 to 6 quarts a day, calculating to about 150 to about 200 ppm active ingredients in the recovered crude oil. In spite of the use of a commercial asphaltene dispersant, operation at this site was unacceptable.

The standard asphaltic solids control additive, a commercial product based on isobutylene-maleic anhydride ester formations, was replaced with ten gallons of a 25 percent active polymer solids formulation containing the 75:25 weight ratio of the preferred nonyl phenol-formaldehyde resin and preferred hydrophilic lipophilic vinylic polymer described above. About ten gallons of this formulation was fed into the treater on a single day. Although no noticeable positive change was observed within about the first 24-36 hours, the treater interface, which was ragged and had been clumping, and which contained large concentrations of asphalts and asphaltenes, shortly thereafter had a smooth texture and the asphalt/asphaltenes had been dispersed in such a way that a smooth, acceptable oil was obtained from the treater for transfer to the pipeline company. This oil was collected, sampled, analysed, and accepted for transport by the pipeline company.

In addition, visual inspection of the 27,500 storage tank indicated that by treating the storage tank with the formulation above, and circulating the contents of the storage tank through a pumping truck at temperatures ranging between about ambient temperatures (35° F.) to about 200° F., all of the asphaltene precipitate in the stock tanks had been dispersed, and could be sent through the heated treater to recover a crude oil which phase was acceptable for transport by the pipeline company.

The preferred asphaltene dispersant formulation containing the nonyl phenol-formaldehyde liquid resins and the H-L V Ps of this invention had successfully treated a precipitated asphalt/asphaltene deposit, which deposit had collected in the stock tanks, and had redispersed these deposits in the hydrocarbon fraction of crude oil, which asphaltic dispersed oil phase passed easily through the heated treater, and recovered the crude oil in a form which was acceptable for transport through a pipeline for further refining and processing.

Finally, another stock tank containing about eight inches of hardened asphaltene bottoms and asphaltic residues was treated with about ten gallons of the preferred formulation described above, which had been simultaneously added to the stock tank along with ten drums of an oily solvent. Ten gallons of the 25% active polymer formulation dissolved in ten drums of oil were then circulated through the tank which contained the hardened asphaltic and asphaltene residues. Tank contents were "rolled" through a pumper truck at a temperature of about 180° F. for a period of about twenty-four hours. Visual inspection indicated that all of the asphaltic bottoms and asphaltenes had been removed, dispersed in the treated oil, and that such results were far superior to a typical tank "roll" which was used to attempt to remove asphaltenes by simply "rolling" the tank with ten drums of untreated oil.

Again the use of the preferred formulations of these inventions easily distributed and dispersed hardened asphaltene and asphaltic residues into hydrocarbon oils and maintained these asphaltic/asphaltene residues in dispersion in these oils, so that this dispersed asphaltene hydrocarbon could be easily transported and processed by refining or other processing steps.

Having described our invention we claim:

1. A method of dispersing asphalt and asphaltene in petroleum, crude oil, or any hydrocarbon fraction thereof exposed to heat transfer processes in an oil refinery, which method comprises adding an effective antifoulant amount of asphalt/asphaltene polymeric antifoulant to said petroleum, crude oil, or fraction thereof, said polymeric anti-foulant comprising an admixture of Polymer A and Polymer B ranging from 95 to 5 weight percent A and from 5 to 95 weight percent B, wherein Polymer A is an alkyl substituted phenol-formaldehyde liquid resin having a weight average molecular weight ranging from about 1,000 to about 20,000, and an alkyl substituent containing from 4 to 24 carbon atoms, which alkyl substituent may be a linear or branched alkyl group; and Polymer B is a hydrophilic-lipophilic vinylic polymer having a structure essentially as follows:

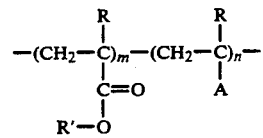

wherein

R is chosen, at each occurrence, from hydrogen and methyl groups; and

R' is a hydrocarbonaceous group containing from 4-24 carbon atoms and chosen from linear or branched alkyl groups, aromatic, cyclic, alkaryl, aralkyl groups, and mixtures thereof; and A is chosen from the groups,

and mixtures thereof; and M is chosen, at each occurrence, from the group hydrogen, alkali metal cations, alkaline earth metal cations, ammonium ions, protonated amines, quaternary amines, hydroxyl ethyl, hydroxy propyl and

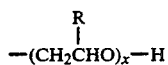

groups, and mixtures thereof; and
R″ is chosen, at each occurrence, from the group

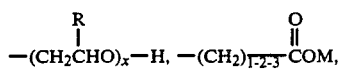

and mixtures thereof; and
m and n are both integers of sufficient number to achieve a weight average molecular weight ranging from about 5000 –250,000, and being of such a ratio as to describe the presence of from 95 to 5 weight percent of the lipophilic monomer, m, and from 5 to 95 weight percent of the hydrophilic monomer, n, and
wherein x ranges from 1 to 20.

2. A method of claim 1 wherein the polymeric anti-foulant comprises a ratio of A:B between about 20:80 and about 80:20.

3. A method of claim 1 wherein the anti-foulant ratio of A:B is from 30:70 to 70:30.

4. The method of claims 1 and/or 2 wherein R' is chosen from linear and branched alkyl groups containing from 5 to 12 carbon atoms and A is

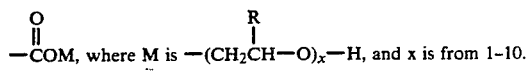

5. The method of claim 1, 2, or 3 wherein the weight ratio of A:B ranges from 70:30 to 30:70 and Polymer A is a 1:1 mole ratio of nonyl phenol : formaldehyde liquid resin having a molecular weight ranging from 2000–8000 and polymer B is a copolymer of lauryl acrylate and hydroxyethyl methacrylate containing from 90–10 weight percent lauryl acrylate and from 10–90 weight percent hydroxyethylmethacrylate.

6. The method of claims 1, 2, or 3 wherein the effective anti-foulant amount ranges from 10 parts per million to about 500 parts per million polymeric anti-foulant based on total hydrocarbon treated.

* * * * *